US 8,255,951 B2

(12) United States Patent
Jerding et al.

(10) Patent No.: US 8,255,951 B2
(45) Date of Patent: Aug. 28, 2012

(54) USER INPUT FOR ACCESS TO TELEVISION SERVICES

(76) Inventors: Dean F. Jerding, Roswell, GA (US);
Arturo A. Rodriguez, Norcross, GA (US); Robert O. Banker, Cumming, GA (US); John M. Schlarb, Alpharetta, GA (US); Robert T. Van Orden, Norcross, GA (US); Bindu Crandall, Norcross, GA (US)

( * ) Notice: Subject to any disclaimer, the term of this patent is extended or adjusted under 35 U.S.C. 154(b) by 2666 days.

(21) Appl. No.: 10/957,849

(22) Filed: Oct. 4, 2004

(65) Prior Publication Data

US 2005/0044577 A1    Feb. 24, 2005

Related U.S. Application Data

(62) Division of application No. 09/565,931, filed on May 4, 2000, now Pat. No. 7,934,232.

(51) Int. Cl.
*H04N 5/445* (2011.01)
(52) U.S. Cl. .................. 725/39; 725/44; 725/46
(58) Field of Classification Search ............. 725/39, 725/40, 61, 47, 51, 28, 37, 135
See application file for complete search history.

(56) References Cited

U.S. PATENT DOCUMENTS

| | | | |
|---|---|---|---|
| 4,706,121 A | 11/1987 | Young | 358/142 |
| 4,751,578 A | 6/1988 | Reiter et al. | 358/183 |
| 4,908,713 A | 3/1990 | Levine | 358/335 |
| 4,963,994 A | 10/1990 | Levine | 358/335 |
| 5,038,211 A | 8/1991 | Hallenbeck | 358/142 |
| 5,253,066 A | 10/1993 | Vogel | 358/188 |
| 5,293,357 A | 3/1994 | Hallenbeck | 348/734 |
| 5,479,268 A | 12/1995 | Young et al. | 358/335 |
| 5,508,815 A | 4/1996 | Levine | 358/335 |
| 5,568,272 A | 10/1996 | Levine | 386/48 |
| 5,798,785 A | 8/1998 | Hendricks et al. | 348/1 |
| 5,809,204 A | 9/1998 | Young et al. | 386/83 |
| 5,822,123 A | 10/1998 | Davis et al. | 348/564 |
| 5,828,419 A | 10/1998 | Bruette et al. | 348/563 |
| 5,850,218 A | 12/1998 | LaJoie et al. | 345/327 |
| 5,915,068 A | 6/1999 | Levine | 386/83 |
| 5,978,043 A * | 11/1999 | Blonstein et al. | 348/569 |
| 6,025,837 A * | 2/2000 | Matthews et al. | 715/721 |
| 6,025,869 A * | 2/2000 | Stas et al. | 725/28 |
| 6,061,097 A * | 5/2000 | Satterfield | 725/44 |
| 6,172,677 B1 * | 1/2001 | Stautner et al. | 715/716 |
| 6,182,287 B1 * | 1/2001 | Schneidewend et al. | 725/48 |

(Continued)

FOREIGN PATENT DOCUMENTS

EP    0811939    12/1997

(Continued)

*Primary Examiner* — Nicholas Corbo
(74) *Attorney, Agent, or Firm* — Merchant & Gould

(57) ABSTRACT

The present invention provides a method and system for accessing services in a television system. In one implementation, a DHCT presents a user a menu containing a plurality of selectable link representations corresponding to separate services or applications offered by the cable television system. The user navigates the menu with a remote device and selects a desired service by choosing the selectable link representation corresponding to the desired service or application. The DHCT receives the user input, translates the selectable link command into an executable call, and activates the service or application corresponding to the selected link representation from the menu chosen by the user.

10 Claims, 10 Drawing Sheets

U.S. PATENT DOCUMENTS

| | | | |
|---|---|---|---|
| 6,243,142 B1 | 6/2001 | Mugura et al. | 348/564 |
| 6,442,755 B1 * | 8/2002 | Lemmons et al. | 725/47 |
| 6,460,181 B1 * | 10/2002 | Donnelly | 725/50 |
| 6,571,390 B1 * | 5/2003 | Dunn et al. | 725/52 |
| 6,604,240 B2 * | 8/2003 | Ellis et al. | 725/45 |
| 6,732,367 B1 * | 5/2004 | Ellis et al. | 725/27 |
| 6,993,782 B1 * | 1/2006 | Newberry et al. | 725/39 |
| 7,185,355 B1 * | 2/2007 | Ellis et al. | 725/46 |

FOREIGN PATENT DOCUMENTS

| | | |
|---|---|---|
| EP | 0854645 | 7/1998 |
| EP | 0909095 | 4/1999 |
| GB | 2343051 | 4/2000 |
| WO | WO 98/56188 | 12/1998 |
| WO | WO 99/04561 | 1/1999 |
| WO | WO 99/35831 | 7/1999 |

* cited by examiner

FIG. 10

SERVICE GUIDE ACCESSED FROM INTERACTIVE PROGRAM GUIDE

USER INPUT FOR ACCESS TO TELEVISION SERVICES

RELATED APPLICATIONS

The present application is a divisional of U.S. patent application Ser. No. 09/565,931 entitled Navigation Paradigm for Access to Television Services filed May 4, 2000 now U.S. Pat. No. 7,934,232, the disclosure and teachings of which are hereby incorporated by reference.

FIELD OF THE INVENTION

This invention relates in general to the field of television systems, and more particularly, to a user interface for accessing services in television systems.

BACKGROUND

Historically, television services have been comprised of analog broadcast audio and video signals. Cable television systems now receive broadcasts and retransmit them with other programming to users over land-line networks, typically comprising fiber optic cable and/or coaxial cable. With the recent advent of digital transmission technology, cable television systems are now capable of providing much more than the traditional analog broadcast video. In addition, two-way and advanced one-way communications between a subscriber and a cable system headend are now possible.

In implementing enhanced programming, the home communication terminal ("HCT"), otherwise known as the settop box, has become an important computing device for accessing video services and navigating a subscriber through a maze of services available. In addition to supporting traditional analog broadcast video functionality, digital HCTs (or "DHCTs") now also support an increasing number of services that are not analog, but rather digital; are not basic broadcast, but rather two-way communication such as video-on-demand; and are not basic video, such as e-mail or web browsers. These are all in addition to the host of other television services that are increasingly being demanded by consumers, examples of which include audio and audio/visual programming, advanced navigation controls, impulse pay-per-view technology, and on-line commerce. In addition to the interactive services, the increased bandwidth available through a digital television system has made it possible for a subscriber to have access to hundreds, or even thousands, of channels and/or services. Thus, in order to provide these more powerful and complex features, the simple conventional channel abstractions need to be extended beyond those that have traditionally been provided.

Each HCT or DHCT (collectively hereinafter "DHCT") is typically connected to a cable or satellite television network. The DHCTs generally include hardware and software necessary to provide the functionality of the digital television system at the client's site. Preferably, some of the software executed by a DHCT is downloaded and/or updated via the cable television network. Each DHCT typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

Because many separate services may be offered by a single cable television service provider to each individual subscriber, including television viewing channels as well as other applications, there is a need for the DHCT to not only be able to provide each service or application that the cable television system provider offers but also be able to flexibly control access to services that are denoted as premium services. As system operators of cable television systems continue to add services and applications, a problem exists in both making the subscriber aware of and also in providing quick access to the new services and channels. Because of the large number of viewing options presented to a subscriber, a problem also exists in providing the subscriber a quick and efficient method to access the most popular or commonly viewed services.

SUMMARY OF THE INVENTION

Briefly described, the preferred embodiment of the present invention provides a method and system for accessing services in a television system. In one implementation, a DHCT presents a subscriber a menu containing a plurality of selectable link representations corresponding to separate services or applications offered by the cable television system. The subscriber navigates the menu with a remote device and selects a desired service for viewing by choosing the selectable link representation corresponding to the desired service or application. The DHCT receives the user input, translates the selectable link command into an executable call, and activates the service or application corresponding to the selected link from the menu chosen by the subscriber.

Many objects, features, and advantages of the present invention will become apparent to one with skill in the art upon examination of the following drawings and detailed description.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 10 is a diagram of an alternative embodiment service guide presentation for the user upon activating the service guide menu from the IPG display in FIG. 8.

DETAILED DESCRIPTION OF THE PREFERRED EMBODIMENT

Figure 1:
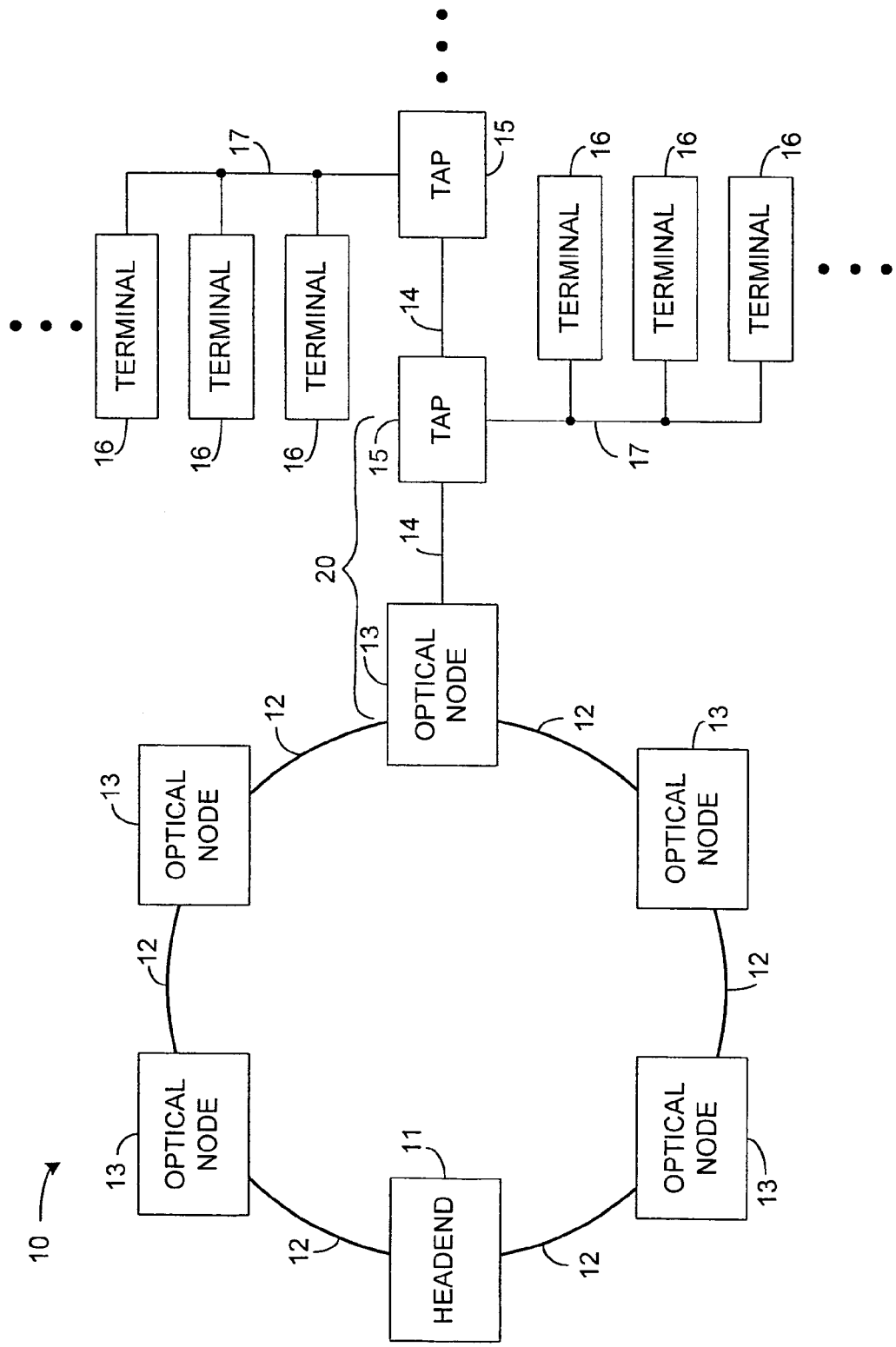
FIG. 1 is a block diagram of a cable television system in accordance with one preferred embodiment of the present invention.

FIG. 1 is a block diagram of a cable television system 10 including a headend 11 for receiving television signals, such as satellite television signals, and converting the signals into a format for transmitting the signals over the system 10. The transmitted signals can, for example, be radio frequency (RF) signals or optical signals, as shown, transmitted over fiber optic cable 12. When the optical signals are transmitted by the headend 11, one or more optical nodes 13 are included in the system 10 for converting the optical signals to RF signals that are thereafter routed over other media, such as coaxial cables 14. Taps 15 are provided within the cable system 10 for splitting the RF signal off, via cables 17, to subscriber equipment such as DHCTs 16, cable-ready television sets, video recorders, or computers. Thus, headend 11 is connected through a network 20 to multiple DHCTs 16.

Figure 2:
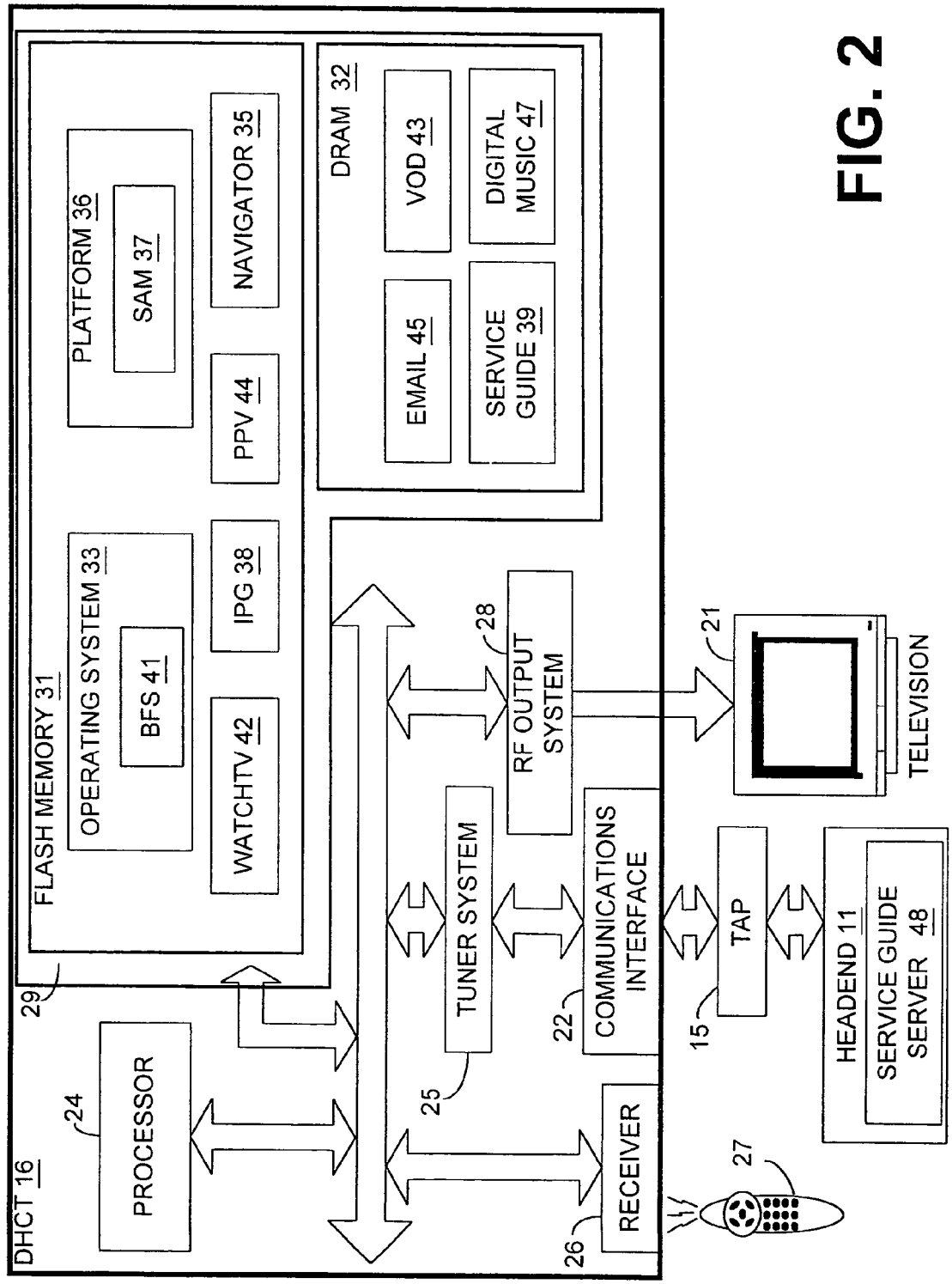
FIG. 2 is a block diagram of a DHCT with components and applications shown in various memories with related equipment in accordance with the preferred embodiment of present invention depicted in FIG. 1.

FIG. 2 is a block diagram illustrating the DHCT 16 and other system equipment. The DHCT 16 is typically situated within the residence or business of a subscriber. It may be integrated into a device that has a display 21, such as a television set, or it may be a stand-alone unit that couples to an external display 21, such as a display included with a computer or a television, and that processes media transported in television signals for presentation or playback to a subscriber (user of the DHCT). The DHCT 16 preferably comprises a communications interface 22 for receiving the RF signals, which can include media such as video, audio, graphical and data information, from the tap 15 and for providing any reverse information to the tap 15 for transmission back to the headend 11 (FIG. 1). The DHCT 16 further includes a processor 24 for controlling operations of the DHCT 16, including a video output port such as an RF output system 28 for driving the display 21, a tuner system 25 for tuning into a particular television channel to be displayed and for sending and receiving data corresponding to various types of media from the headend 11. The tuner system includes in one implementation, an out-of-band tuner for bi-directional quadrature phase shift keying (QPSK) data communication and a quadrature amplitude modulation (QAM) tuner for receiving television signals. Additionally, DHCT 16 includes a receiver 26 for receiving externally-generated information, such as user inputs or commands for other devices. The DHCT 16 may also include one or more wireless or wired communication interfaces, also called ports, for receiving and/or transmitting data to other devices. For instance, the DHCT may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device 27 or keyboard that includes user-actuated buttons.

In one implementation, a memory portion 29 of the DHCT 16 includes flash memory 31 and dynamic random access memory (DRAM) 32 for storing the executable programs and related data components of various applications and modules for execution by the DHCT 16. Both the flash memory 31 and the DRAM memory 32 are coupled to the processor 24 for storing configuration data and operational parameters, such as commands that are recognized by the processor 24.

Basic functionality of the DHCT 16 is provided by an operating system 33 that is contained in flash memory 31. One or more programmed software applications, herein referred to as applications, are executed by utilizing the computing resources in the DHCT 16. The application executable program stored in flash memory 31 or DRAM memory 32 is executed by processor 24 (e.g., a central processing unit or digital signal processor) under the auspices of the operating system 33. Data required as input by the application program is stored in DRAM memory 32 and read by processor 24 from DRAM memory 32 as need be during the course of application program execution. Input data may be data stored in DRAM memory 32 by a secondary application or other source, either internal or external to the DHCT 16, or possibly anticipated by the application and thus created with the application program at the time it was generated as a software application program, in which case it is stored in flash memory 31. Data may be received via any of the communication ports of the DHCT 16, from the headend 11 via the DHCT's network interface (i.e., the QAM or out-of-band tuners) or as user input via receiver 26. A type of input data fulfills and serves the purpose of parameters as described below. Data generated by application program is stored in DRAM memory 32 by processor 24 during the course of application program execution.

The flash memory 31 also contains a platform library 36. The platform library 36 is a collection of functionality useful to applications, such as a Timer Manager, Compression Manager, Database Manager, Widget Toolkit, String Managers, and other utilities (not shown). These utilities are accessed by applications as necessary so that each application does not have to contain these utilities thus resulting in memory consumption savings and a consistent user interface.

A Service Application Manager (SAM) provides a model in which the user can access services available on the system. A service consists of an application to run and a parameter, such as data content, specific to that service. The SAM handles the lifecycle of the applications on the system, including the definition, initiation, activation, suspension and deletion of services they provide and the downloading of the application into the DHCT 16 as necessary. Many services can be defined using the same application component, with different parameters. The SAM includes a SAM server (not shown) in headend 11 and a SAM client 37 in the DHCT 16. The SAM client 37 (hereinafter referred to as SAM 37) is a part of the platform 36. As a non-limiting example, an application to tune video programming could be executed with one set of parameters to view HBO and a separate set of parameters to view CNN. Each association of the application component (tune video) and one parameter component (HBO or CNN) represent a particular service that has a unique service ID.

An application client is the portion of an application that executes on the DHCT 16 and provides the application's services to the user typically through a graphical user interface. Also contained in flash memory 31 is a navigator application 35 that provides a navigation framework for the user to access services available on the cable system. Examples of the services include, in one implementation, watching television and pay-per-view events, listening to digital music, and an interactive program guide, each of which is controlled through separate applications in flash memory 31. The navigator 35 also allows users to access various settings of the DHCT 16, including volume, parental control, VCR commands, etc.

Interactive program guide (IPG) 38, Watch TV 42, and pay-per-view (PPV) 44 are all resident applications in flash memory 31. The IPG 38 displays a program guide to the user and populates the guide with program data for selection. Watch TV 42 enables a user to simply "watch television" while PPV 44 enables viewing of premium television services. These applications, because they are in flash memory 31, are available to the user and do not need to be downloaded each time the DHCT 16 initializes.

The applications that are stored in the DRAM 32 may be applications that are loaded when the DHCT 16 initializes or are applications that are downloaded to the DHCT 16 upon a user-initiated command using an input device such as the remote 27. In this non-limiting example, as shown in FIG. 2, DRAM 32 contains the following application clients (hereinafter referred to as "application(s)"): a video-on-demand application (VOD) 43, an e-mail application 45, a digital music application 47. Additionally, DRAM 32 could also contain a calendar application (not shown) and a calculator application (not shown). It should be obvious to one with ordinary skill in the art that these applications are not limiting and merely serve as examples for this present embodiment of the invention.

The applications shown in FIG. 2 and all others provided by the cable system operator are top level software entities on the network for providing services to the user. In one implementation, all applications executing on the DHCT 16 work with the navigator 35 by abiding by several guidelines. First, an application must utilize and implement the SAM 37 for provisioning, activation, and suspension of services. Second, an application must share DHCT 16 resources with other applications and abide by the resource management policies of the SAM 37, the operating system 33, and the DHCT 16. Third, an application must handle all situations where resources are unavailable without navigator 35 intervention. Fourth, when an application loses service authorization while providing a service, an application should suspend the service gracefully. The navigator 35 will reactivate an individual service application when it later becomes authorized. Finally, an application must be configured so it does not respond to input commands reserved for the navigator. For instance, as a non-limiting example, when user input commands are entered via a wireless remote control device or keyboard, the application must be configured so it does not have access to certain user input keys that are reserved by the navigator 35 (i.e., power, channel +/−, volume +/−, etc.). However, without any limitations to the aforementioned, in certain circumstances certain applications during the course of program execution may reach a machine-state in which input keys that would ordinarily be reserved may be employed for input by the application but only during that particular machine-state. For instance, an application may display a user interface that specifically requests input or selection from the user in which one or more of the reserved keys are used momentarily during that machine-state.

Other forms of entering input commands, such as voice-activated commands in a DHCT 16 with an input communication port that receives signals from a wired or wireless microphone and circuitry to process and compare digitized speech signals, would be subject to similar configuration so that DHCT 16 does not respond to input commands reserved for the navigator 35. In this alternate embodiment, the audio input port (not shown) in the DHCT 16 is a single receiver device. Additionally, the DHCT 16 has digital signal processing capability that implements a subtraction filter to effect subtraction of the audio generated by the DHCT 16 from the speech signal received from the user.

Another application shown in FIG. 2 that is contained in DRAM 32 is the service guide application client 39 hereinafter referred to as "service guide 39"). The service guide 39 consists of a graphical user interface to create a hypertext markup language (HTML) file (or other middleware markup languages such as one created via XML (Extensible Markup Language)). The service guide 39 may be customized remotely by the system operator by editing the generated HTML file or by using a graphical HTML editor. The service guide 39 uses an HTML display engine and parser (not shown) to parse the HTML file and render the service guide display to the user. Depending on the embodiment, the HTML engine may be part of the service guide 39 or extended by the operating system 33 or platform 36, or some combination of both. The service guide 39 receives input commands generated by a user via an input device, such as a remote control device 27 (FIGS. 2 & 6), and received by an input communication port 26 (FIG. 2) in DHCT 16. A service selection may be effected by navigating (moving the highlight "cursor") through the service guide display by manipulating designated buttons of a wired or wireless remote device or keyboard 27 or electronic mouse (not shown). The selection of a service or entry from the service guide 39 HTML display invokes HTML commands, which are received by the service guide 39 and translated into one or more application executable calls that are executed by the navigator 35 and the SAM 37 in activating the desired service. Any of a multiplicity of services may be activated through the service guide 39 and its corresponding interface (discussed below), including any native application to the DHCT 16, any downloadable application supported by the cable television provider at the headend 11, any Internet web content, or any other information source provided through the cable television system 10.

References to the selection of a service or entry from the multiplicity of services and/or entries displayed by the service guide 39 on display 21 comprise the process of interactively navigating by moving the highlight cursor and transmitting input commands to DHCT 16. The processor 24 processes data extracted and/or interpreted from the input commands to effect visual cursor position and visual feedback of the user's selection on the display 21. When the user inputs a selection, the processor 24 invokes communication between internal components in the DHCT 16, including software components such as the navigator 35 and SAM 37, to activate the selected service. The processor 24 employs the messaging services of the operating system 33 to effect the communication between any two or more of the internal components.

Figure 3:
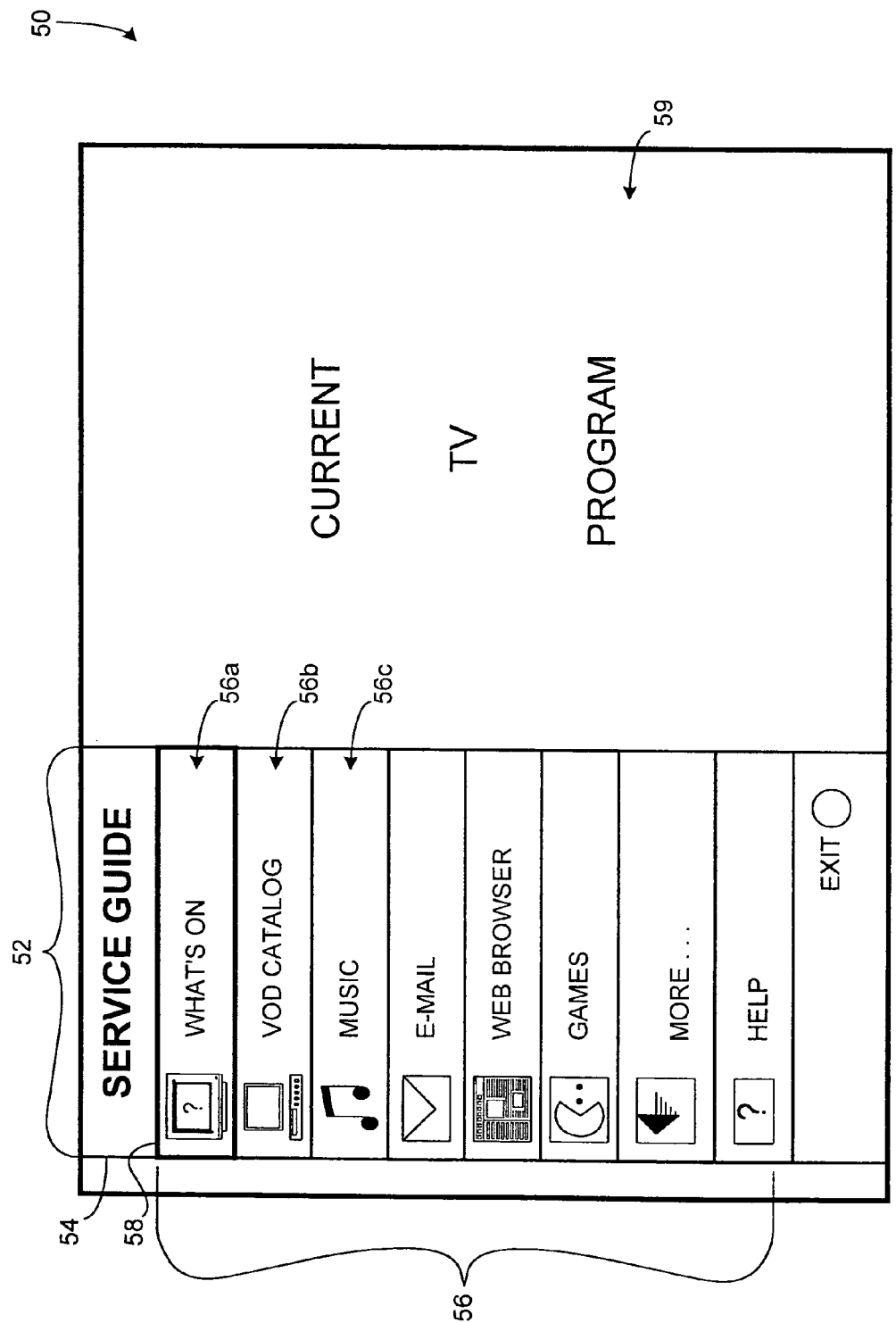
FIG. 3 is a diagram of the service guide presented to the user by the DHCT in FIG. 2 upon activation of the service guide application.
Figure 4:
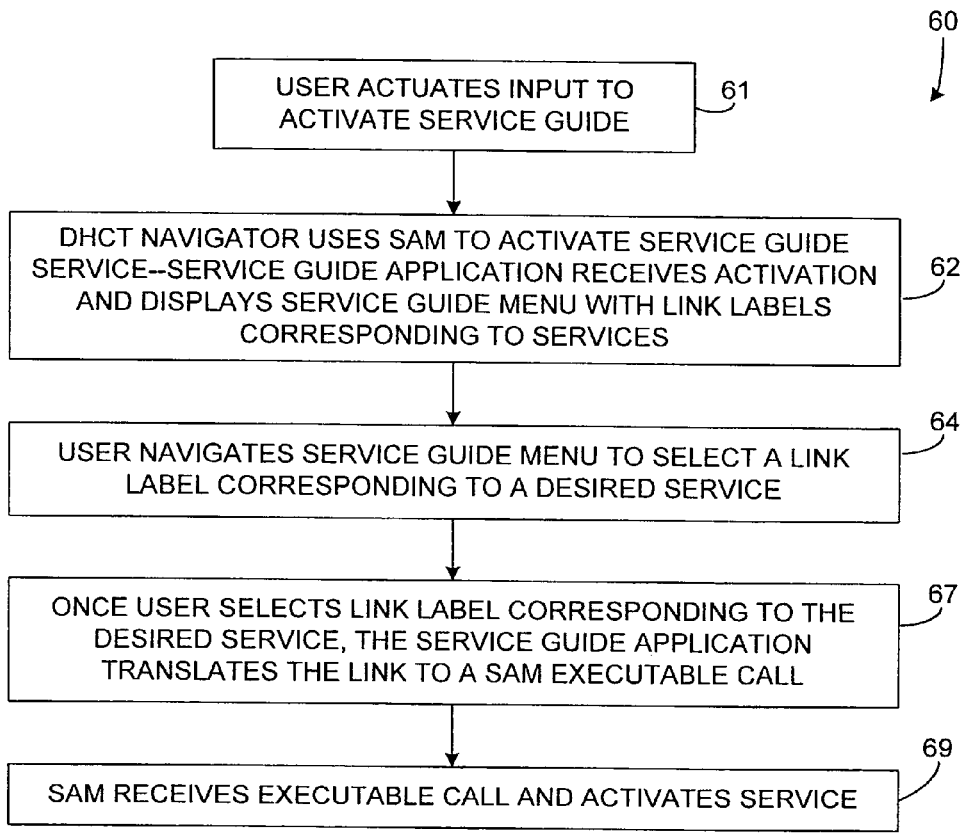
FIG. 4 is a flowchart of the process of presenting the service guide menu as depicted in FIG. 3 and activating the chosen service or application corresponding to the selected link in the service guide menu.

FIG. 3 is a diagram of the display 50 with the service guide menu 52 presented to the user by the DHCT 16 depicted in FIG. 2. With additional reference to the flowchart 60 shown in FIG. 4, the service guide menu 52 is presented upon activation of the service guide 39 (FIG. 2), as depicted in step 61 and as described above. Upon activation of the service guide 39, a navigable menu 52 is presented to the user as shown in FIG. 3 and depicted in step 62 as shown in FIG. 4. In this embodiment, the HTML display includes an identification string 54 indicating that the pop-up menu 52 is the service guide. The HTML display also includes a series of icons and text strings that are each selectable hyper-text link labels 56 organized in a vertically oriented list of services for the user to navigate (by moving the cursor) with the remote device 21. A footer includes a text string and graphical image instructing the user how to exit the service guide menu 52.

One of the selectable link labels 56 is highlighted to visually identify the current cursor position 58 so that the user can enact cursor navigation functionality and move among the selectable link labels 56, as shown in step 64 (FIG. 4). Once the user, via the remote 21 or other input device, selects one of the selectable link labels 56, the service guide 39 translates the associated HTML hyper-text link destination information for the selected link label 56 to an executable call for the navigator 35 or the SAM 37, as shown in step 67 (FIG. 4). The SAM 37 implements the service request by executing and activating the desired application to provide the service corresponding to the selected selectable link label 56, as shown in step 69 (FIG. 4).

In the preferred embodiment, the selectable link labels 56 are written in a customized version of the middleware markup language HTML. The selectable link label 56 is only one type of link representation that may be displayed to the user by the DHCT 16. Moreover, a link label 56 may be displayed as text only, text plus an icon, or an icon only. The selectable link labels 56 are rendered based upon HTML (or XML) hyperlink definitions. Therefore, the link definitions are comprised of an anchor <A> to define the start and destination of the hypertext link definition, and the text between the start and an end tag defines the label for the link definition. The label can include graphics defined with IMG or OBJECT elements. One example link definition expressed in HTML includes the following syntax: <A HREF="tv://destination_service"><IMG SRC="graphic_icon">text label</A>. In this example, "tv://destination service" is the destination definition (also referred to herein as a destination address, destination reference, service reference, or universal resource locator (URL)) and "<IMG SRC="graphic_icon">text label" is the label definition (also referred to herein as one type of link representation definition or label reference). Also in this example, the label definition includes an IMG element and text, both of which will be used to generate visual representations that are selectable by the user. The IMG element further defines the location of the image file, as a URL.

A system operator at the headend 11 uses a service guide server 48 (FIG. 2) to configure the service guide display 52 depicted in FIG. 3. The system operator may construct the selectable link labels by writing the customized HTML code necessary to construct the service guide menu 52. An alternative embodiment provides a graphical interface in the service guide server 48 (FIG. 2) to enable a system operator to graphically create the service guide menu 52 that is implemented by the DHCTs 16. From a multiplicity of services available on the cable system and shown in the graphical interface, the operator chooses and organizes into a list the services to be offered by the service guide 39 for all the DHCTs 16 in the network 20.

In an alternate embodiment, a user customizes his/her service guide display 52 by calling a telephone number that guides the user through a series of automated voice menus. The user enters account information and a personal identification number received from the cable service company and uses a brochure as a reference to make selections through an automated phone menu system.

In another alternate embodiment, the user accesses the Internet through a computer, PC, DHCT 16, or similar device and logs on to a specified secure and encrypted web site facilitated by the cable service company to select the set of services that the user desires in the service guide display. The user enters account information and a password or personal identification number to navigate through a set of menus and make customized selections that are routed from a secured web site to the service guide server 48.

In another alternate embodiment, the user configures the service guide menu 52 similarly in an interactive fashion by navigating through a series of menus generated by a configuration application (not shown) running in the DHCT 16 and presented on display 21. The user can re-customize his/her service guide preferences in the future by calling the automated phone menu system, logging on to the specified secure and encrypted web site, or through the configuration application running in the DHCT 16. Regardless of which method is utilized to create the service guide menu 52 in the service guide server 48, the information is communicated to the service guide client 39 executing on each DHCT 16 in the network 20 for display to the user.

The service guide 39, in the preferred embodiment, is communicated to the DHCT 16 when the DHCT 16 initializes as part of a power up sequence, but, in alternative embodiments, the service guide 39 could be a resident application in the DHCT 16 or could be downloaded to the DHCT 16 upon command by the user. The service guide client executable 39 is received from a broadcast file system (BFS) carousel that continually broadcasts it and the service guide HTML file(s) 52 across the network. This BFS system (not shown) provides a mechanism for delivering various types of media or data from a group of servers to a BFS client 41 in the operating system 33 for each DHCT 16. This data can contain practically any type of information. Applications on both the server and the client can access the data via the BFS in a similar manner to a file system found on disk operating systems. In an alternative embodiment, the HTML file(s) are retrieved via HTTP from the service guide server 48.

The service guide menu 52 (FIG. 3), as stated above, is comprised of multiple selectable link labels 56 that activate services and are, in the preferred embodiment, expressed in a customized version of HTML. In utilizing customized HTML (or XML) to create the service guide menu 52 (FIG. 3), several features may be implemented by the service guide 39. For example, the language of the textual display of the service guide menu 52 may be defined by the system operator by including the following HTML syntax: <html lang="language-code">. The "language-code" variable allows the service guide to be presented in various languages depending on the language code parameter (i.e., English ("en"), French ("fr"), Spanish ("es")), etc.

The underlying link definition, or syntax, that comprises the selectable link labels 56 (FIG. 3) corresponding to the services provided by the DHCT 16 includes identification of the particular services, so that when one of the link labels 56 is selected by the user, the service guide 39 knows which service to activate. The underlying link definition may, for example, include in the reference a short description of the service. Consequently, the syntax, <A HREF="tv://service|short_description">, would reference the target service and the application that provides the service according to the short description assigned or corresponding to the target service. Similarly, the SAM service ID or the actual channel assigned to a desired service may also be used to activate a service. The syntax <A HREF="tv://service/decimal_id">, where the "decimal_id" is "10," identifies the SAM service with the service ID that is 10. Additionally, the syntax, <A HREF="tv://channel/display_channel_number">, where "display_channel_number" is equal to "3," activates the service on the receiver's channel 3.

Examples of services that can be included in the service guide menu 52 include, but are not limited to, those provided by the following applications: watching TV, listening to digital music, impulse pay-per-view, interactive program guide, DHCT settings, E-mail, video-on-demand, games-on-demand, videophone and/or conferencing, ticker tape data services, web browser, home banking, billing, calendar, calculator, context-sensitive help applications that display help text depending on the current channel service, downloading digital music into an MP3 device attached to the DHCT, uploading images from a digital camera attached to the DHCT, e-commerce, etc. In the preferred embodiment, any service available to the user in the cable system 10 can be accessed via the service guide menu 52, as configured by the system operator and/or in the respective alternate embodiments as configured by the user to reflect a user's own customization and preferences.

As discussed above, graphical icons and text representing the services can be included as part of the selectable link labels 56, as shown in 56a, 56b, and 56c. For example, the HTML link definition syntax <A HREF="tv://service/ipg"><IMG SRC="bfs://images/ipg_icon.jpg">What's On</A> would be used to create the selectable link representation in 56a. This embodiment is shown in FIG. 3.

Figure 5:
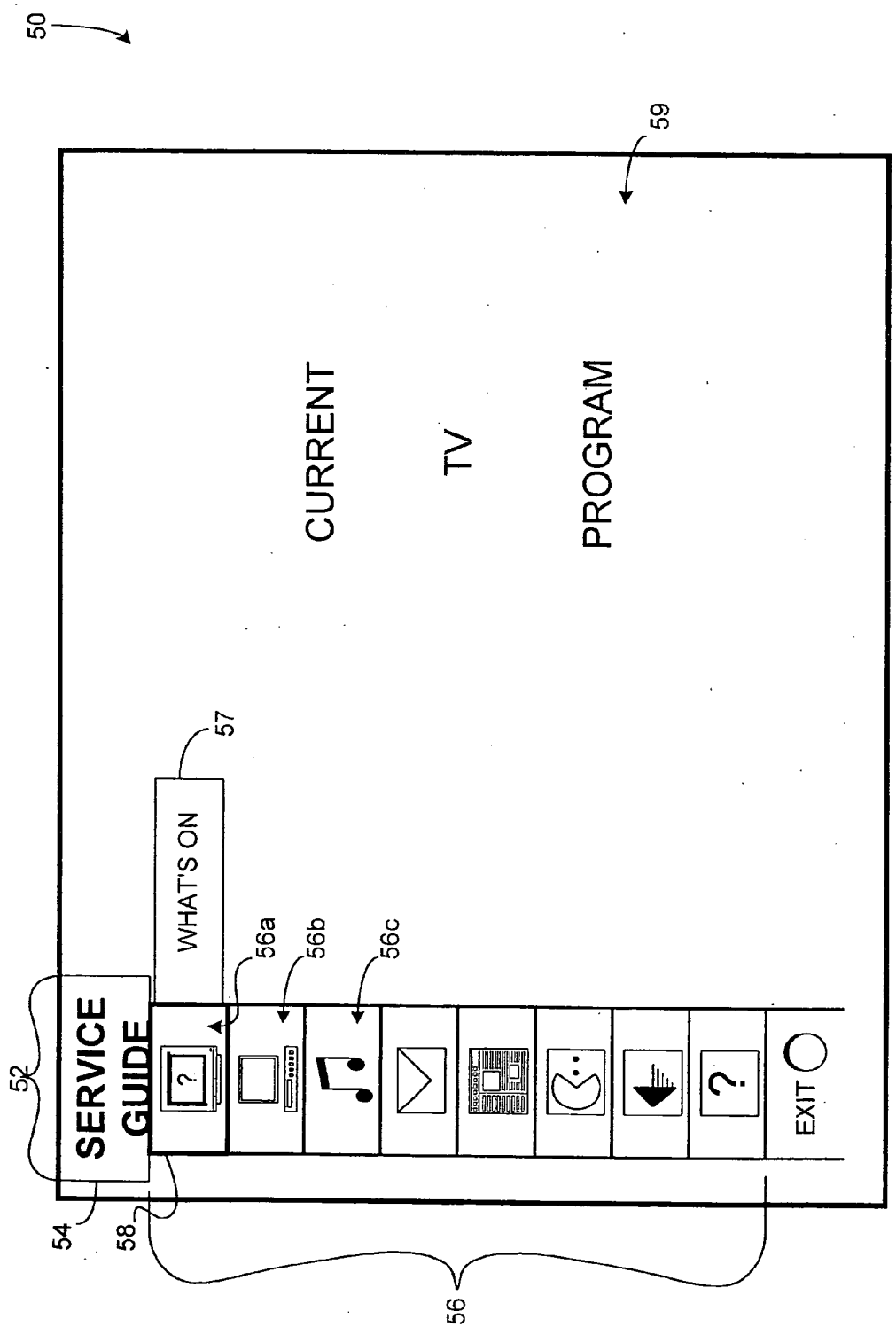
FIG. 5 is a diagram of the service guide presented to the user by the DHCT in FIG. 2 depicting selectable link representations with additional information banners viewable by the user upon moving the cursor to a particular selectable link representation.

An alternative embodiment enables additional information about the selectable link labels to be incorporated in the link definition itself by specifying a title for the information to be displayed. As a non-limiting example, the link definition <A HREF="tv://service/wnbc" TITLE="information about the link"><IMG SRC="tv://service/logo/215"><A> instructs the service guide 39 that additional information exists for this service and may be presented to the user in a variety of formats depending on the layout of the service guide menu 52. The "TITLE" attribute describes the object specified with the HREF attribute. If the service guide menu 52 is arranged in a horizontal toolbar format at the bottom of the screen (see FIG. 9), the information referenced by the "TITE" attribute is displayed in a fixed location immediately above or below the row of buttons. Finally, if the service guide menu 52 is arranged in a vertical toolbar format at the left of the screen (as shown in FIG. 5), the "TITLE" information may appear in a window 57 to the right of each selectable link label 56 centered vertically with the link label 56.

If, as in one example, the title information for all selections is not already shown to the user upon initial presentation of the service guide menu 52, the information display about each selectable link label 56 may be accessed in several methods. As a non-limiting example, an information key on a remote device 27, such as the "INFO" key 72 (FIG. 6), may be configured to instruct the service guide application 39 to display the information corresponding to a selectable link label 56 as described above. As another non-limiting example, the service guide 39 may immediately present the information 57 (FIG. 5) about a selectable link label 56 after the user moves the cursor 58 on to the selectable link label 56 as described above. The presentation of the information 57 (FIG. 5) may be immediate or after a programmable timed delay set by the system operator to insure that the user is interested in the selectable link label 56 and not merely surfing between the plurality of selectable link labels 56. If the information is configured to display in a fixed portion of the screen display as described above, the service guide 39 may immediately present any available information referenced by the selectable link label 56 when the cursor 58 moves to a new selectable link label 56.

The underlying link definition for the selectable HTML link label 56 may additionally include information regarding activation of the target service in a specified screen state and location. As a non-limiting example, the selectable link definition <A HREF="tv://channel/32">NBC</A> uses the full screen in tuning to the channel that is assigned to the target service. Upon selection of the link label 56, for example, though not shown, corresponding to the link definition <A HREF="tv://channel/13">ABC</A> from the service guide 52 (FIG. 3), the service assigned to channel 13 is displayed in the full screen, and the service guide 52 and current TV program 59 are removed from view. As an additional non-limiting example, the link definition <A HREF="tv://service/email">E-mail</A> when activated causes the E-mail service to overlay on top of the current TV program 59 in full screen mode.

Some applications may be configured so that they are presented to the user in only a portion and/or relative spatial position of the display while another service or application is presented to the user in another location of the display 21. For example, a selectable link definition such as <A HREF="tv://service/email; env=fullScreenObstructed (location)">E-mail</A> (where location is a set of xmin, ymin, xmax, ymax coordinates) indicates to the service guide 39 that the E-mail service is to be activated in full screen obstructed mode and that the current TV program 59 is to be shown in a reduced location. A user is able to utilize the E-mail service while the DHCT 16 presents a current TV program 59 in a reduced screen portion of the display. Similarly, the selectable link label 56 in the service guide 52 may also specify activation of the target service in a reduced portion of the screen while retaining the current TV program 59 in the remaining portion of the display. For instance, a sport ticker tape may be designated to be displayed in the bottom of the TV display while a stock ticker tape may be designated to be displayed on the top. Thus, as a non-limiting example, the selectable link definition <A HREF="tv://service/stocks; env=reducedScreen(location)">Stock Ticker</A> instructs the service guide 39 (FIG. 2) to activate the stock ticker service with the stock ticker application's screen reduced to a specified portion of the screen as indicated by the "location" coordinates. The service guide 39 instructs the SAM 37 to activate the ticker application overlaid on the current TV program 59 (or any existing service on the current channel) when the user chooses this link label 56 from the service guide menu 52 (FIG. 3). In this manner, the target services may be activated in accordance to the selectable link labels 56 in the service guide menu 52 as configured by the system operator at the headend 11 of the network 20.

As discussed above, it is possible for the service guide menu 52 to include a link label 56 to a specific channel number accessible by the user. For example, the link definition <A HREF="tv://channel/13">ABC</A> can be included in the service guide content. When selected by the user, the service guide instructs the navigator to tune the DHCT to channel 3, thereby activating the service (ie., ABC) defined for that channel.

The service guide menu 52 is additionally configurable to control the behavior and presence of the links based on the service authorization status of the DHCT 16. As a non-limiting example, the XML syntax <META UNAUTHORIZED="display_mode"> in the header of the service guide customized HTML file, sets the display format of the link according to the level of authorization for the user. Service authorization information is available to the service guide via the SAM API. If the "display_mode" is "activeIfAlternative," the link label 56 is selectable (shown active) even if the service is unauthorized as long as an alternate unauthorized service is available. Thus, the user may select the link label 56 to the target service, but the service guide 39 will activate the alternative service if the service specified in the service guide menu 52 is not authorized. Additional information regarding activation of alternative services to unauthorized services may be found in related U.S. patent application Ser. No. 09/542,484 filed Apr. 3, 2000, which is herein incorporated by reference in its entirety. If the "display- _mode" is set to "inactive," links to services that are not authorized for the DHCT 16 are displayed to the user in a "grayed out" format so that the user may see the link label 56 but may not select the link label 56 for activation of the underlying target service. Alternatively, unauthorized services may not be displayed at all. Alternatively, unauthorized services are coalesced into a service category such as "Other Purchasable Services" or "Other Available Services."

Either the system operator of the cable television system or the user of the DHCT 16 may configure the display status of the link labels 56 with respect to authorization status of the target service. The system operator may designate the display status with respect to service authorization status for a link by a graphical user interface that graphically configures the service guide 39 XML/HTML code. The user, through a settings menu (not shown) may configure the service guide menu 52 so that the display mode of one or more selectable link labels 56 is "inactive" or "none" so the display of the selectable link label 56 conforms to the display modes described above.

The service guide menu 52 is additionally configurable to control the behavior and presence of the link labels 56 based on the parental control status of the DHCT as maintained by the navigator 35 application. As a non-limiting example, the syntax <META BLOCKED=display_mode"> in the header of the service guide customized HTML file directs the service guide 39 to set the display format of the link label 56 according to the level of parental control set by the user. Service parental control information is available to the service guide 39 via the navigator API. If the "display_mode" is "active," the link label 56 is selectable (shown active) even if the service is blocked. Thus, the user may select the link label 56 to the target service, but the service guide will display a pop-up barker (not shown) indicating that the service is not available because it has been blocked by parental control. If the "display mode" is set to "inactive," links to services that are blocked by parental control are displayed to the user in a "grayed out" format so that the user may see the link label 56 but may not select the link label 56 for activation of the underlying target service. Finally, if the "display_mode" is set to "none," links to services that are blocked by parental control are not included in the service guide menu 52.

Either the system operator of the cable television system or the user of the DHCT 16 may configure the display status of link labels 56 with respect to parental control status of the target service. The system operator may designate the display status with respect to service blocking status by a graphical user interface that graphically configures the service guide 39 HTML (or XML) code. More likely, the user, through a settings menu (not shown), may configure the service guide menu 52 so that the display mode of one or more link labels 56 is "inactive" or "none" so the display of the selectable graphic 56 conforms to the display modes described above. Alternatively, the user can configure the service guide menu 52 by calling the automated phone menu system, logging on to a specified secure and encrypted web site, or navigating through a configuration application running in the user's DHCT 16 as described above.

The service guide 52 may allow configurability by the user so as to include one or more favorite links so designated by the user to appear in the service guide menu 52. While the system operator may configure one or more selectable link labels 56 to always be presented in the service guide menu 52, the system operator may configure the service guide menu 52 to display selectable link labels 56 to services chosen by the user for incorporation in the service guide menu 52. As a non-limiting example, the system operator can include the syntax <A HREF="tv://favorite/favorite_number"> whereby a user may choose to designate a frequently watched channel, such as ESPN, to appear on the service guide menu 52 through a settings display (not shown) so the user can quickly access the ESPN channel upon activating the service guide menu 52. The user may designate any channel or service as a favorite for inclusion in the service guide menu 52 for quick access. The user is limited to the number of favorite selectable link labels 56 as permitted by the system operator in configuring the service guide display, as specified in the "favorite_number" in the non-limiting example.

In an alternative embodiment, multiple favorite entries are allowed in the service guide menu 52 and the user is allowed to edit and rename the entry specifying a favorite set. Furthermore, any service included in a favorite set can appear in one or more favorite sets as the user desires.

In an alternative embodiment, selectable link labels 56 may be added to the service guide menu 52 by the service guide 39 itself for services most frequently activated by the user. The navigator 35 or other software in the DHCT 16 may be configured to tabulate the frequency of activation for services channels or applications and include one or more selectable link labels 56 for the most popular or frequently activated services. Thus, as a non-limiting example, the system operator can configure the service guide menu 52 to include one or more link labels 56 to frequently accessed services by specifying the syntax <A HREF="tv://frequent/frequent_num">. If a user frequently utilizes, for example, a Cyberdeli service (an interactive service supported by the DHCT 16, but not shown, for ordering delicatessen foods), the service guide 39 will include a selectable link label 56 referencing the Cyberdeli service in the service guide menu 52. Alternatively, the DHCT 16 may present the user the tabulated list of most frequently activated services for the user to choose which services to incorporate on the favorites list.

The display order and the number of most frequently activated services by the user may be programmed by the cable operator or alternatively configurable by the user during any of the user configuration sessions described above. In an alternate embodiment, the set of services most frequently activated by the user is displayed in the service guide menu 52 in chronological order from top to bottom. Alternatively, the displayed chronological order is from bottom to top. In yet another alternate embodiment, the finite set of services most frequently activated by the user is displayed in the service guide menu 52 in an order programmable as a function of both chronology and the amount of time of use of each service. For instance, a first service that was frequented fewer times than a second service within the past few days may be displayed with higher precedence in the display order or retained for a longer period of time in the set of most frequently activated services if the accumulated time usage of the first service is significantly higher than the second service over the same span of time.

The service guide menu 52 may be configured to additionally display a selectable link label 56 to services or channels in a time-specific manner. The service guide 39 may be configured to switch as time progresses from a first configurable service guide menu presentation to a second configurable service guide menu presentation according to a schedule that specifies the time interval when each of two or more respective service guide menu presentations is to be active. Two or more from a multiplicity of configurable service guide menu presentations are each configured to be active for one or more intervals of time in a recurring schedule. Only one configurable service guide menu is active at a time throughout the configurable recurring schedule but a first configurable service guide menu may be active throughout one or more distinct and non-overlapping time intervals of the configurable recurring schedule. The recurrence of the schedule is configured to one of a multiplicity of choices such as a weekly, daily, or a monthly recurring schedule.

In one embodiment, the system operator configures a multiplicity of time-adaptive service guide presentations for each of a multiplicity of recurring schedule choices. For instance, the system operator may configure six different arrangements to choose from for users that opt for a time-adaptive service guide on a daily recurring schedule. On the other hand, the system operator may configure more than six different arrangements to choose from for users that opt for a time-adaptive service guide on a weekly recurring schedule.

In another embodiment, in addition to having the choice of selecting one of a multiplicity of time-adaptive service guides pre-configured by the system operator, the user can additionally configure a time-adaptive service guide according to the user's preference for a user-selected recurring schedule from the set of recurring schedule choices. The user can enter the user's preferences through an interactive configuration session in the DHCT 16 or in alternate embodiments by calling the automated phone menu system or logging on to a specified secure and encrypted web site as described above.

Figure 6:
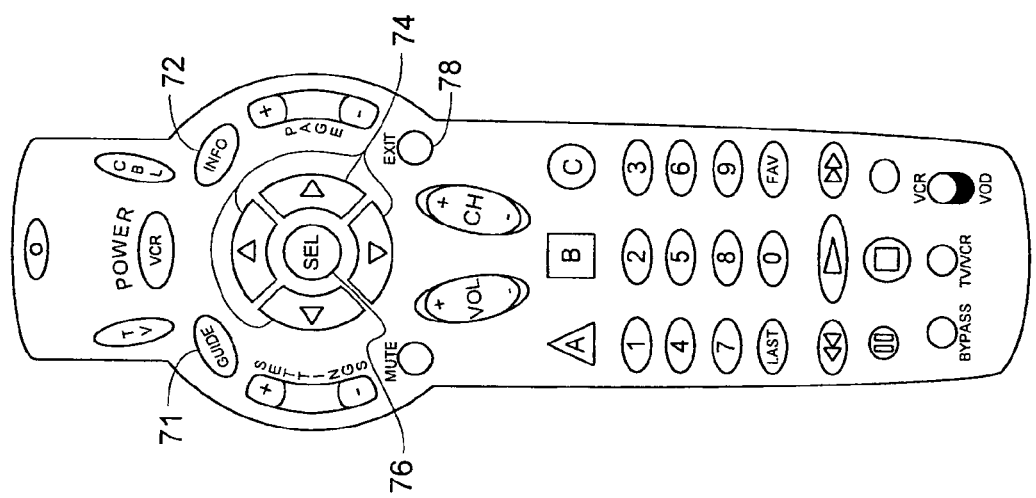
FIG. 6 is a diagram of a remote unit with a dedicated key to access the service guide depicted in FIG. 3.

In one embodiment, a time adaptive service guide 39 running a weekly recurring schedule may include selectable link labels 56 to, for example, news and financial programming for one or more specific time intervals (e.g., 7:30 to 8:00 A.M. and/or 11:00 to 11:30 PM for news; 1:00 to 5:00 PM for financial services) during weekdays. During weekends, the weekday selectable link labels 56 become inactive. Examples of selectable link labels for weekend days include sports programming (i.e., football on Sundays from 1:00 to 7:00 PM), videos-on-demand (i.e., Saturdays from 8:00 to 11:00 PM), or pizza delivery. This is accomplished by configuring the service guide server 48 to include different HTML files for each day, such that the service guide client 39 receives a different set of link labels 56 depending on the aforementioned time criteria A user may access the service guide menu 52 in several ways. FIG. 6 is a block diagram of a remote unit 27 with a dedicated key to access the service guide 39. The navigator 35 on the DHCT 16 may be configured to activate the service guide 39 to present the service guide menu 52 whenever the user presses the GUIDE key 71 on remote 27. The user may navigate the service guide menu 52 by pressing the arrow keys 74 to move the cursor 58 (FIG. 3) to the desired selectable link label 56 (FIG. 3) in the service guide menu 52. Once the user moves the cursor 58 to the desired target service or application, the user presses the SEL key 76 to select the selectable link label 56 corresponding to that target service. If the user desires to exit the service guide menu 52, the DHCT 16 may be configured to remove the service guide menu 61 and return to the current TV program 59 if the user presses the GUIDE key 71 a second time or the EXIT key 78. It should be clear to one of ordinary skill that virtually any key on the remote 27 may be configured to activate the service guide application 39. It should also be obvious that remote 27 could be any type of corded or wireless remote or keyboard or other input devices. Other input commands can be received as signals in DHCT 16 by alternate means of receiving input, including voice signals and signals received via a communication port in DHCT 16.

Figure 7:
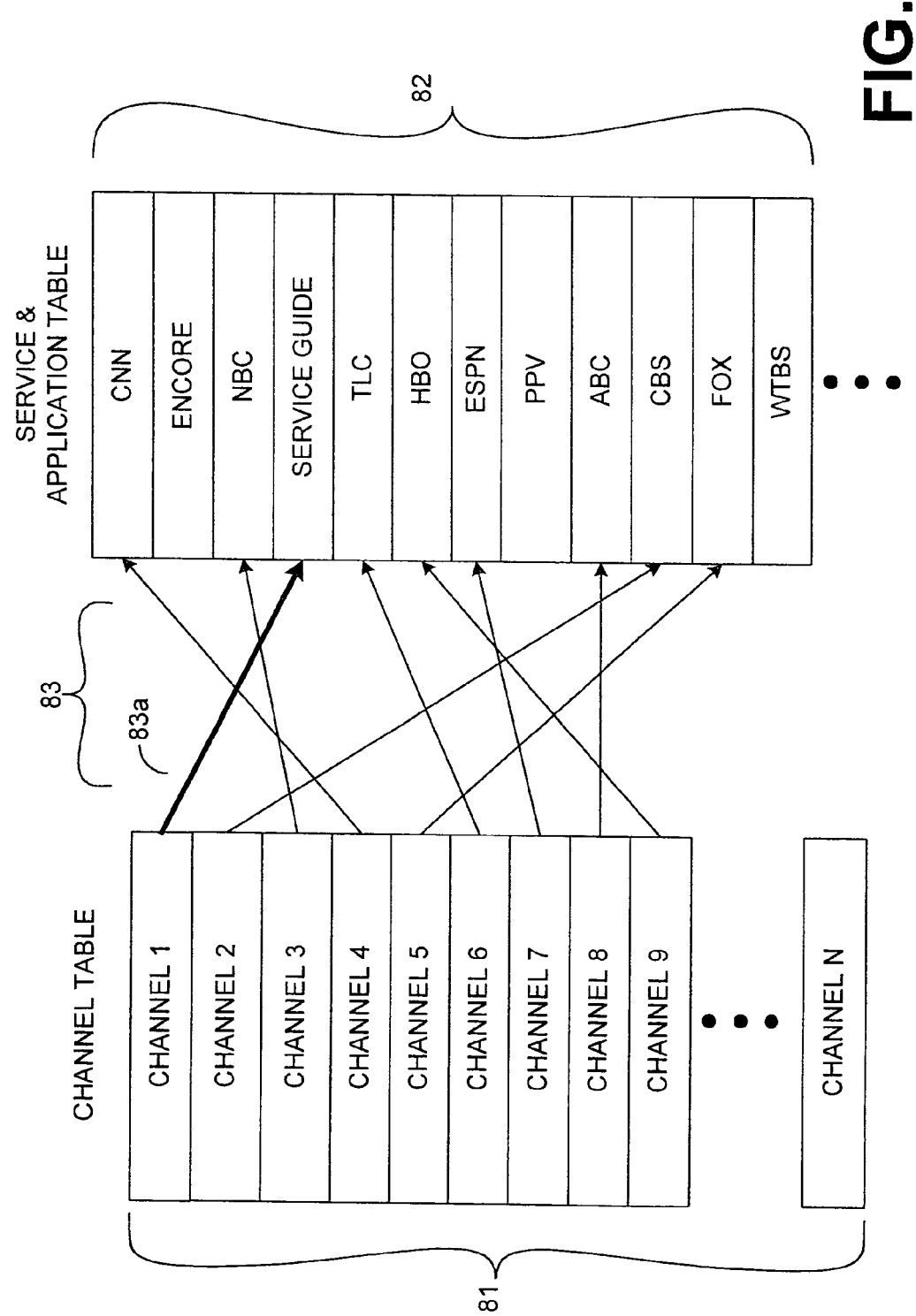
FIG. 7 is a diagram of the mappings of services to channels wherein the service guide in FIG. 3 is mapped to a channel of the channel table.

The service guide 39 may also be activated by the user upon entering a channel input corresponding to the service guide service 39, as defined by the system operator. FIG. 7 is a diagram of the mappings of services to channels wherein the service guide menu 52 in FIG. 3 is mapped to a channel of the channel table 81. The system operator at the headend 11 configures the assignment of services to channels. The channel table 81 is a list of all channels in the cable television system, and the service table 82 is a list of all available services or applications provided by the cable television system. The system operator configures the channel line-up by setting the various channels in channel table 81 to point 83 to the various service or application in the service table 82. A channel in the channel table 81 may point 83a to the service guide service, provided by the service guide application 39, so that the service guide menu 52 is displayed whenever the user selects that channel. Thus, in a non-limiting example, the service guide menu 52 is presented to the user upon the DHCT 16 receiving a command to display channel 1. Consequently, the service guide menu 52 is presented if the user inputs a channel 1 command or merely scrolls through the channels and stops on channel 1.

When the service guide service is assigned to a channel, the layout of the service guide covers the entire screen, similar to that shown in FIG. 9 and discussed below, without the current channel area. This is done by configuring the navigator 35 to activate the service guide with a SAM service resource environment of the full screen, and the service guide HTML content would be formatted for the entire 640×480 screen resolution of the DHCT.

Figure 8:
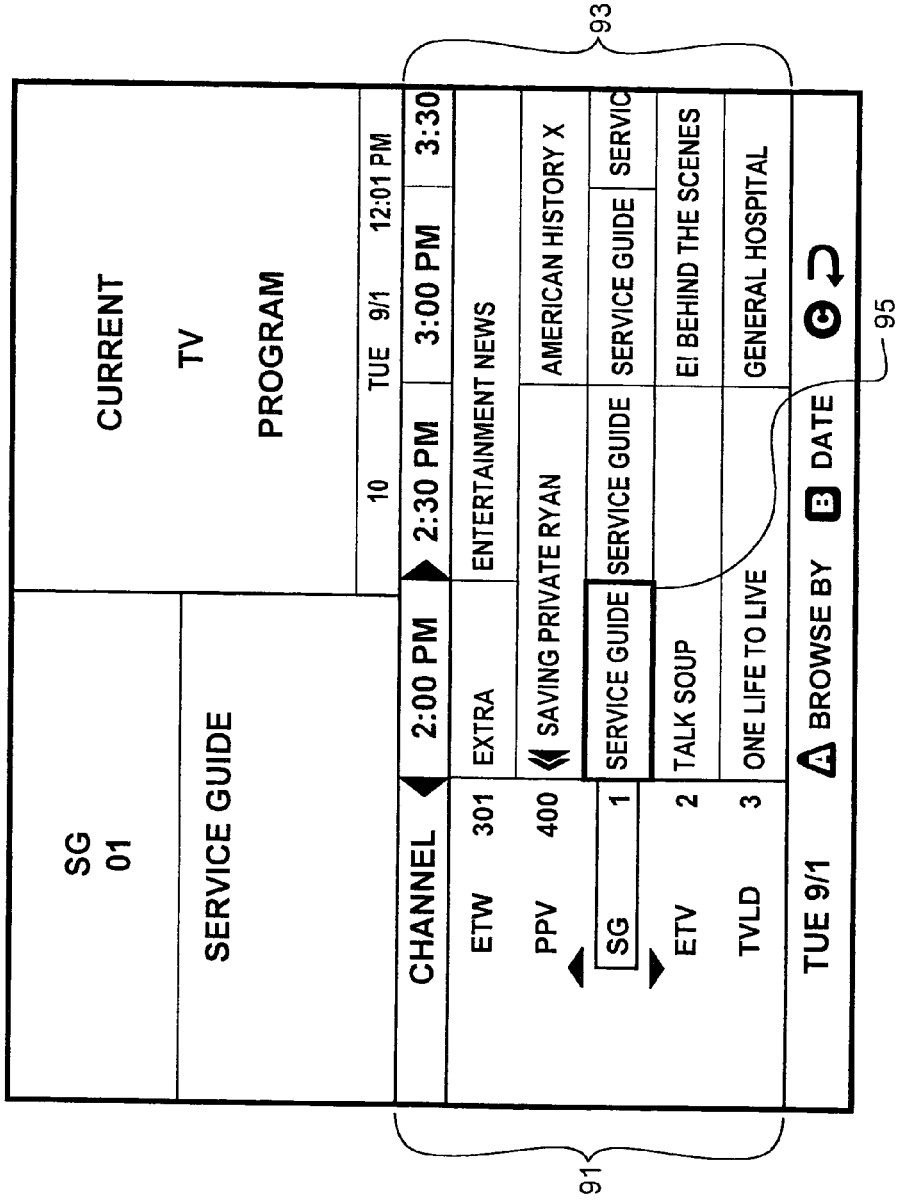
FIG. 8 is a diagram of an interactive program guide display that provides access to the service guide in FIG. 3.

FIG. 8 is a screen display diagram of an interactive program guide (IPG) display 90 that provides access to the service guide menu 52 in FIG. 3. The IPG display 90 presents current and future viewable programs to the user in a scrollable format based on channel and time. The user may navigate the IPG display 90 to select a current program for immediate viewing. The IPG display 90 is a vertically scrollable list of channel numbers in a channel portion of the display 91 and a horizontally and vertically scrollable program listing display 93 of program services corresponding to the respective channels in the channel portion of the display 91. The user navigates a cursor 95 in the program listing display 93 to select the individual program or service for activation. The service guide menu 52, as shown in FIG. 3, may be activated by the user in similar fashion by moving the cursor 95 to the service guide program listing in the program listing display 93. In this non-limiting example, the service guide 39 is listed in the channel portion of the display 91 as channel 1, and the service guide menu 52 is activated by moving the cursor 95 to the service guide listing in the program listing display 93 and selecting the service guide menu 52 with the remote 27.

Figure 9:
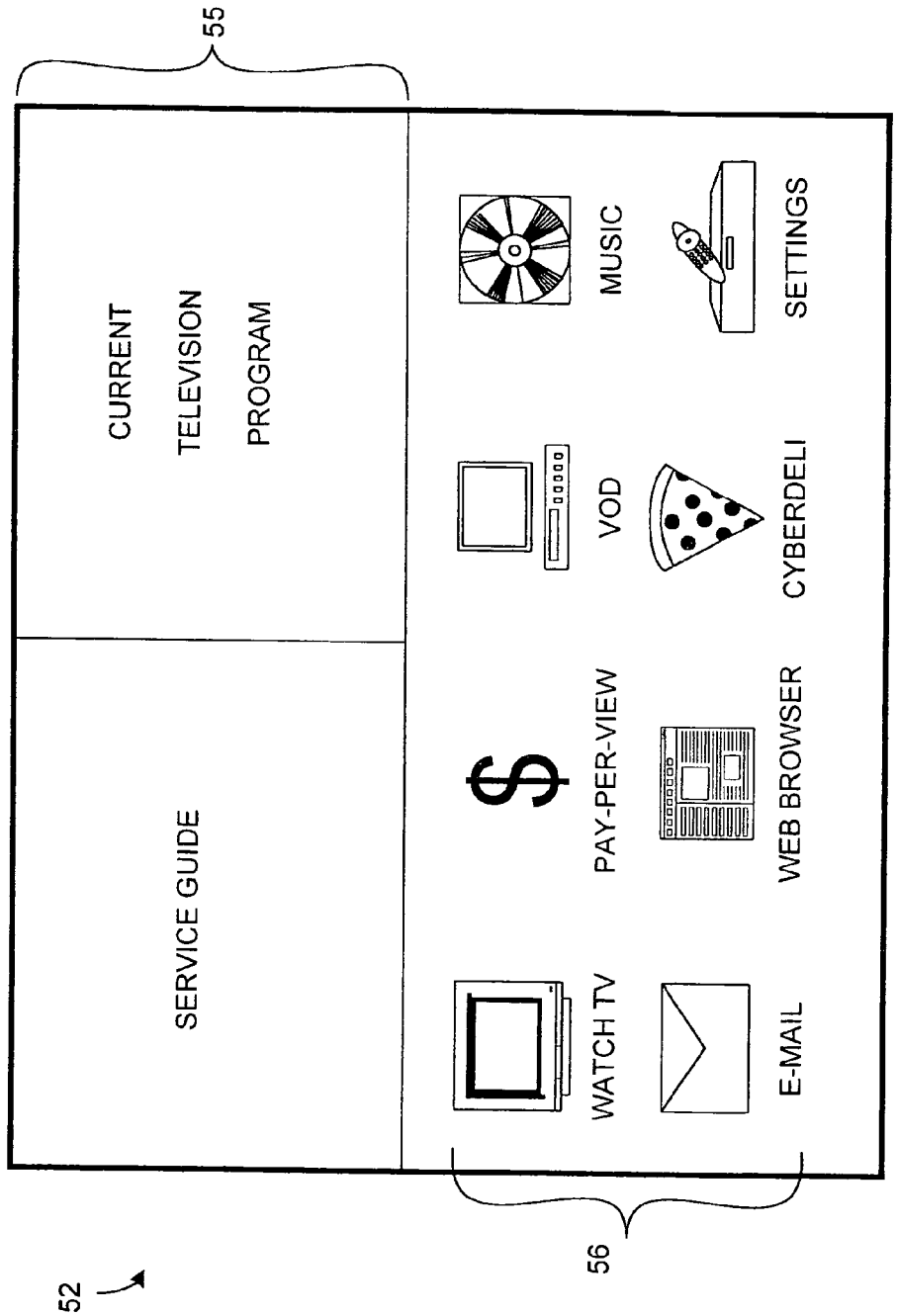
FIG. 9 is a diagram of the service guide in FIG. 3 displayed upon selection of the service guide menu from the interactive program guide of FIG. 8.

FIG. 9 is a screen display diagram of another example of the service guide menu 52 in a full screen format. Note that the selectable link labels 56 are arranged in horizontal format with the title information already displayed for each selectable link label 56. This is displayed upon selection of the service guide using a key on the remote as described previously. This is done by configuring the navigator 35 to activate the service guide 39 with a SAM service resource environment of the whole screen, and the service guide HTML content would be formatted for the entire 640×480 screen resolution of the DHCT. The current television program is displayed in ¼ screen section 55 by including an OBJECT with the SRC of "tv:" in the HTML content. The user may navigate the selectable link labels 56 of services 56 in the service guide menu 52 in similar fashion as described above.

An example of HTML code necessary to create the service guide 52 in full screen obstructed format as shown in FIG. 9 is as follows:

```
<html lang="en">
<TABLE BGCOLOR=color TEXT=color HBGCOLOR=color
HTEXT=color>
<TR>
    <TD COLSPAN=2>
        <IMG SRC="logo.jpg">
    </TD>
    <TD COLSPAN=3>
        <OBJECT SRC="tv:">
    </TD>
</TR>
<TR>
    <TD>
        <A HREF="tv://channel/901" TITLE="WATCH TV">
            <IMG SRC="tv://service/logo/233">
        </A>
    </TD>
    <TD>
        <A HREF="tv://channel/1001" TITLE="PAY-PER-VIEW">
            <IMG SRC="tv://service/logo/278">
        </A>
    </TD>
    <TD>
        <A HREF="tv://service/501" TITLE="VOD">
            <IMG SRC="tv://service/logo/33">
        </A>
    </TD>
    <TD>
        <A HREF="tv://service/1400;env=fullScreenObstructed( )"
        TITLE="MUSIC">
        <IMG SRC="tv://service/logo/299">
        </A>
    </TD>
</TR>
<TR>
    <TD>
        <A HREF="tv://service/1201" TITLE="E-MAIL">
            <IMG SRC="tv://service/logo/304">
        </A>
    </TD>
    <TD>
        <A HREF="tv://service/1202" TITLE="WEB BROWSER">
            <IMG SRC="tv://service/logo/305">
        </A>
    </TD>
    <TD>
        <A HREF="tv://service/1203" TITLE="CYBERDELI">
            <IMG SRC="tv://service/logo/306">
        </A>
    </TD>
    <TD>
        <A HREF="tv://service/1204" TITLE="SETTINGS">
            <IMG SRC="tv://service/logo/307">
        </A>
    </TD>
</TR>
</TABLE>
</html>
```

Alternatively, the <OBJECT src="tv">tag could be removed, and the navigator 35 could be configured to activate the service guide service in the fullScreenObstructed mode. This would also cause the current channel to be displayed in the specified obstructed rectangle, rather than determining the location based on the location of the "tv:" OBJECT in the service guide HTML content.

FIG. 10 is a screen display diagram of an alternative embodiment service guide presentation 90 for the user upon activating the service guide menu 52 from the IPG display 90. In this alternative embodiment, the service guide menu 52 is overlaid on the IPG display 90 for the user to navigate the selectable link labels 56. The IPG display 90 is shown dimmed by hatching provide emphasis on the service guide menu 52, but the IPG display 90 could also be dimmed of discolored from its original display format signify its background position. The user may exit the service guide menu by depressing the Exit key 78 (FIG. 6) to return to the IPG display 90. This view is shown to depict that the service guide menu may be presented to the user in a variety of formats and may be accessed by the user by a variety of methods.

The service guide 39, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. Furthermore, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The invention claimed is:
1. A system, comprising:
a computer readable medium encoded with a markup language (ML) display engine and parser; and
a processor configured with the ML display engine to render an ML-based service guide on display device, the service guide comprising a first selectable link representation corresponding to a first service and a second selectable link representation corresponding to a second service, the first selectable link representation config- ured by an operator independent of user designated preferences, the second selectable link representation based on user preference.

2. The system of claim 1, wherein the markup language comprises an extensible markup language (XML).

3. The system of claim 1, wherein the markup language comprises a hypertext markup language (HTML).

4. The system of claim 1, wherein the processor is further configured with the parser to receive and parse an ML file provided by a remote server, the ML file enabling the customization of the service guide based on operator input.

5. The system of claim 1, wherein the processor is further configured with the ML display engine to render each of the first and second selectable link representations based upon a respective hyperlink ML definition, the respective hyperlink ML definition comprising ML link destination information.

6. The system of claim 5, wherein the computer readable medium is further encoded with a service activation application, wherein responsive to user selection of the first or second selectable link representation, the processor is further configured with the ML display engine to translate associated ML link destination information for the selected one of the first or second link representation to an executable call for a service activation application.

7. The system of claim 6, wherein the processor is further configured with the service activation application to activate a service that corresponds to the selected one of the first or second link representation.

8. The system of claim 1, wherein the processor is further configured with the ML display engine to render plural selectable link representations based on user preferences, the plural selectable link representations constrained in quantity by a system operator.

9. The system of claim 1, wherein the processor is further configured with the ML display engine to render content on a display device based on selection of one of the first selectable link representation and the second selectable link representation, the content corresponding to the first or second service, respectively.

10. The system of claim 1, wherein the processor is further configured with the ML display engine to tabulate a frequency of activation for service channels or applications and include additional selectable links based on most frequently activated services.

* * * * *